Jan. 21, 1958  D. W. PETERSON  2,820,569
CAP FOR TANK FILLER PIPE
Filed May 31, 1955

INVENTOR.
David W. Peterson
BY J. W. Lovett
ATTORNEY 2,820,569

CAP FOR TANK FILLER PIPE

David W. Peterson, Hinsdale, Ill., assignor to General Motors Corporation, Detroit, Mich., a corporation of Delaware Application May 31, 1955, Serial No. 511,878

8 Claims. (Cl. 220—44)

This invention relates to a cap for a pipe and more particularly to a cap or closure adapted for closing the end of a filler pipe serving a tank such as a fuel or automobile radiator tank.

A cap which is simple in construction, low in cost, and also adapted to provide a reliable filler pipe closure under normal conditions, yet able to serve as a vent during abnormal pressure conditions, is a device currently much in demand. It will be appreciated that many thousands are produced each year for automotive use alone and any improvement, simplification or reduction in cost of such devices is not to be lightly disregarded.

An object of the present invention is to provide an improved cap for tank filler pipes.

Another object is to provide a cap for a filler pipe in which cap a minimum of parts are employed, these parts being arranged to occasion automatic venting during abnormal conditions of operation.

To the above ends, a feature of the invention comprises a cap having yieldable annuli with a flexible plate or disc interposed between the annuli.

This and other important features of the invention will now be described in detail in the specification and then pointed out more particularly in the appended claims.

Figure 1:
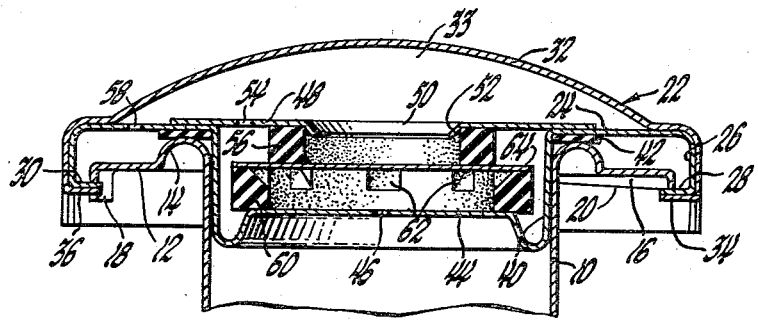
Fig. 1 is a sectional view taken along the axes of a filler pipe and closure therefor as operating under normal conditions and the cap constituting a preferred embodiment of the invention.

In Fig. 1 of the drawings, a filler pipe 10 for serving a gasoline tank is shown and the end of the pipe is provided with an outwardly extending flange 12 having an annular ridge portion 14 forming a seat and diametrically opposed flange or cam portions 16 and 18. As will be understood, the cam portions 16 and 18 are conventional on many filler pipes and each of these portions is provided with an inclined surface such as the surface 20 and also diametrically opposed and upwardly directed slots (not shown). These slots and cam surfaces are provided for the reception and engagement of tongues on a cap to be attached to the filler pipe. Cam surfaces and slots for this purpose are shown in the United States Patent 1,843,128, issued February 2, 1932, in the name of W. A. Healy. Other means, such as threads or an inwardly directed pipe flange, may be employed to attach a cap utilizing the present invention to a filler pipe.

One embodiment of the present invention is shown in the drawings as a cap or closure generally indicated at 22 and this cap comprises a main body 24 having a peripheral flange 26 and diametrically opposed tongues 28 and 30. A cover 32 is suitably joined to the main body 24 and tightly engages the peripheral flange 26 to form an integral unit therewith while defining a dome chamber 33. The tongues 28 and 30 are reinforced by tabs 34 and 36, respectively, which are bent-in portions of the cover 32. As will be understood, the tongues 28 and 30 are provided for entering the slots (not shown) in the flange 12 when the cap is applied to the pipe and for engaging the cammed flanges 16 and 18 to hold the cap 22 tightly in engagement with the filler pipe 10 when the cap is rotated.

In order properly to center the cap on the pipe, the main body 24 is provided with a central and cylindrical portion or depending cup 40 and surrounding this portion is located a sealing washer 42 which is adapted to engage the annular ridge portion 14 on the filler pipe. The cylindrical portion or cup 40 is so made as to be integral with a lower plate member or cup bottom 44 which is centrally perforated at 46.

Suitably affixed to the main body 24 is an upper member 48 which is provided with a large central opening 50 defined by a flange 52 and also with a small perforation or vent 54 located exteriorly of the contact area between a small upper annulus 56 and the member 48. The main body 24 is perforated as at 58 above the flange 12 but this is not necessary as the cover 32 and body 24 need not be in fluid-tight engagement. In contact with the periphery of the member or cup bottom 44 is a large lower annulus 60 and this annulus bears eight oblique passages 62 which pass upwardly from the interior of the annulus 60 to a flexible metallic plate 64 interposed between the annuli 60 and 56. It will be noted that the oblique passages 62 do not pass through opposite faces of the annulus 60 but do pass through two faces of the annulus which intersect—i. e., the passages 62 extend outwardly and toward the plate 64.

The small annulus 56 is in contact with the lower face of the member 48 at all times and is suitably located with respect to the member 48 because of the presence of the flange 52. It is to be noted, however, that the annulus 56 may be adhesively joined to the member 48 thereby dispensing with the need of the flange 52.

The annulus 60 is at all times in contact with the margin of the upper face of the member or cup bottom 44 and in sealing relation therewith. This contact may be assured also by the use of adhesive but, if desired, the cylindrical portion 40 may be provided with inwardly directed projections (not shown) for insuring that the annulus 60, as well as the flexible plate 64, do not become unduly displaced from their central positions. The flexible metallic plate 64 is always in sealing relation with the annulus 56, but here again an adhesive may be employed if desired. Lateral displacement of the coaxial elements 60 and 64 may also be assured by providing a minimum of clearance between them and the portion 40.

It will be understood that the small upper annulus 56 and also the large lower annulus 60 are made from rubbery materials such as neoprene which is of such a nature as to be distorted when subjected to pressure and which is sufficiently resilient when the pressure is removed to regain its normal shape.

As seen in Fig. 1, the parts are shown in their proper positions, for operation during normal use in which event the opposed and substantially parallel faces of the members 44 and 48 are bridged by the annuli 56 and 60 with the plate 64 interposed to form an unvented closure. In operating under normal conditions; that is, under normal pressures existing in the tank or filler pipe being served, the plate 64 is seated against the annulus 56 as well as the annulus 60 and the latter is sealed against the member or cup bottom 44. The composition of the annuli material or the design of the annuli may be adjusted to maintain this unvented closure under normal conditions which may include a substantial range of pressure and vacuum within the filler pipe 10.

Figure 2:
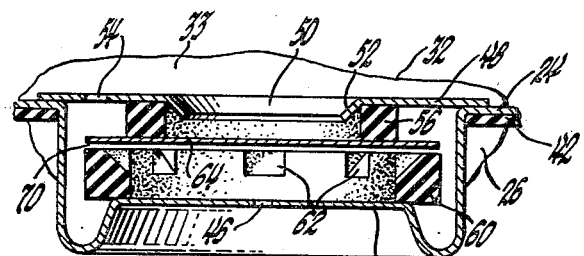
Fig. 2 is an enlarged view, in section, of operative parts shown in Fig. 1 but as positioned when under undue pressure within the tank or filler pipe being vented.

When the pressure rises an undue extent or above a predetermined value within the tank or filler pipe 10, the pressure will raise the plate 64 from its seat on the annulus 60 thereby distorting the small annulus 56, as shown in Fig. 2. Raising of the plate 64 creates an annular passage 70. This permits the constrained fluid in the filler pipe or tank to escape by way of the opening 46, the annular passage 70, the opening 54, the dome chamber 33, and the opening 58.

Figure 3:
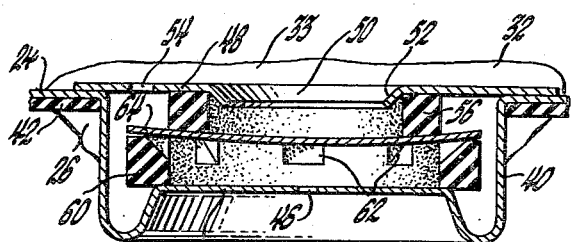
Fig. 3 is a view like that of Fig. 2 but showing the parts as positioned for relieving a vacuum condition.
Figure 4:
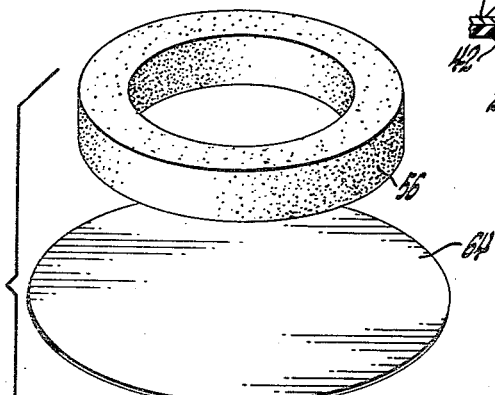
Fig. 4 is an exploded view of three main parts as employed in the closure or cap of Figs. 1, 2 and 3.

In the event that vacuum increases to an undue extent within the filler pipe 10, the air enters through the openings 58 and 50 and causes the plate 64 to become dished because of the reduced pressure thereunder, as shown in Fig. 3. As a result, the small annulus 56 distorts a slight amount and the outer margin of the plate 64 raises from its seat on the large annulus 60 and air entering the opening 54 will pass through the passages 62 and enter the tank by way of the opening 46.

Obviously, when either an excess pressure or vacuum condition has been eliminated by the venting provided, the plate 64 will seat again, as shown in Fig. 1, normally to close the tank filler pipe.

In the drawings, the outside diameter of the small annulus 56 is made substantially equal to the inside diameter of the large annulus 60. These dimensions may be changed relatively but not to such an extent as to prevent proper unseating of the margin of the plate 64 for relief of a vacuum condition.

I claim:

1. A cap comprising a cover with means for attaching the same in sealed relation to the end of a filler pipe, two members fixed to said cap and having opposed faces, one of said members having an opening, a large annulus of yieldable material contacting said one member around said opening and having at least one oblique passage, the other of said members having two openings, a small annulus arranged in sealed relation with the other of said faces and around only one of said two openings, a flexible metallic plate interposed between and normally contacting said annuli, and said oblique passage normally extending from within said large annulus and terminating at said plate.

2. A cap adapted to be attached to the end of a tank filler pipe and presenting two opposed faces, one of said faces having an opening adapted to communicate directly with said filler pipe, a large annulus of yieldable material sealingly contacting said one face around said opening, a smaller annulus of yieldable material in sealing engagement with the other of said faces, a flexible plate interposed between said annuli, a passage in said large annulus leading from the interior thereof to said flexible plate, the other of said faces being perforated without and within its contactual area with said small annulus, said annuli and flexible plate being confined within a cylindrical portion of said cap, and a cover joined to said cylindrical portion and enclosing said other face.

3. A cap adapted to be attached to the end of a filler pipe and comprising a cover, a main body encompassed by said cover and having a cylindrical depending portion for entering said filler pipe, a centrally perforated member supported at the lower end of said cylindrical member, another perforated member within said cover, said perforated members having opposed faces, two annuli of yieldable material with a flexible plate interposed between them, said annuli and plate bridging the space between said opposed faces, and one of said annuli having an oblique passage extending outwardly and terminating at said plate.

4. A cap adapted to be attached to the end of a filler pipe and having a cylindrical depending member for entering said filler pipe, centrally perforated members supported at each end of said cylindrical member, said perforated members presenting opposed faces, two annuli of yieldable material with a flexible plate interposed between them, said annuli and plate being substantially parallel and bridging the space between said faces, one of said annuli being smaller than the other and surrounding at least one of the perforations in one of said perforated members, and the other annulus having a passage therein extending outwardly and to said flexible plate.

5. A cap adapted to be attached to the end of a filler pipe and having a cup with a bottom, said cup being adapted to depend into said pipe, an opening in said bottom, a member covering said cup and affixed to said cap, said member having a central large opening and a smaller opening, a cover fixed to said member and having a passage and dome chamber in communication with the ambient air and said large opening, a first annulus of yieldable material surrounding said large opening, said smaller opening being outside of the zone included by said annulus, a second annulus of yieldable material and of larger diameter arranged parallel to said first annulus, a flexible plate interposed between and normally contacting the said annuli, and said second annulus having a passage extending outwardly and upwardly through two intersecting surfaces of the latter and towards said plate.

6. A cap comprising a cover, a cup depending from said cover, a perforated member closing the top of said cup and fixed to said cover, the bottom of said cup and said perforated member having opposed surfaces and each having a central opening, two annuli of yieldable material with a flexible plate interposed between them, said annuli and plate being arranged in said cup, all of said elements being concentrically arranged, said annuli being in sealed contact with said opposed surfaces, one of said annuli having a passage therein extending outwardly and upwardly to said plate and spaced from the outer surface of said one annuli, and the space between said annuli and the wall of said cup being in communication with the interior of said cover.

7. A cap adapted to be attached to the end of a filler pipe and enclosing two members presenting fixed opposing faces, one of said members being a first member and perforated substantially centrally, the other of said members being a second member and perforated substantially centrally and to one side of its center, two annuli of yieldable material with a flexible imperforate plate interposed between them, said annuli and plate normally bridging the space between said faces, one of said annuli having an upwardly and outwardly extending passage terminating at said plate, and the arrangement being such that a reduced pressure in said filler pipe may dish said plate and open said passage to provide an air inlet.

8. A cap adapted to be attached to the end of a filler pipe and having a cylindrical depending member for entering said filler pipe, an upper member fixed to said depending member and having a vent spaced from the axis of said cap and communicating directly with the interior of said depending member, a centrally perforated lower member extending across said depending member and cooperating with said upper member to present fixed opposing faces, an upper closed annulus of compressible material abutting said upper member clear of said vent, a lower closed annulus of compressible material having an internal diameter greater than the internal diameter of said upper annulus and abutting said lower member, an imperforate plate interposed between said annuli, said annuli and plate being substantially parallel and cooperating within said depending member normally to bridge the space between said faces to form a closure against fluid flow through the cap, and the arrangement being such that undue fluid pressure in said filler pipe may be exerted against said plate to compress the material of said upper annulus and displace said plate away from said lower member to provide a passage from said filler pipe through the perforated lower member and around the edge of said upper annulus to said vent.

References Cited in the file of this patent

UNITED STATES PATENTS 2,311,971 Shaw ---------------- Feb. 23, 1943
2,423,295 Crabbe et al. ------------ July 1, 1947

FOREIGN PATENTS 506,747 Belgium ---------------- Apr. 29, 1952